United States Patent Office 3,029,575
Patented Apr. 17, 1962

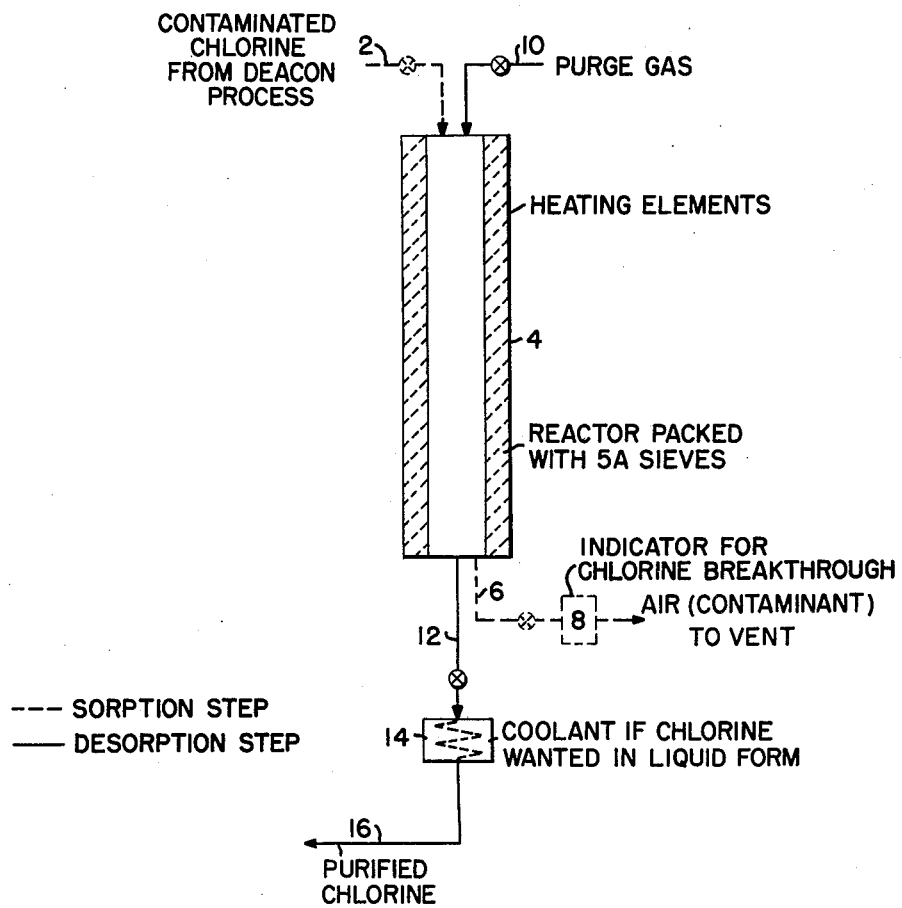

3,029,575
CHLORINE SEPARATION PROCESS
Jackson Eng and Roger M. Butler, Sarnia, Ontario, Canada, assignors to Esso Research and Engineering Company, a corporation of Delaware
Filed Nov. 3, 1958, Ser. No. 771,550
6 Claims. (Cl. 55—62)

The present invention relates to the purification of halogen gases and vapors, such as chlorine, bromine, fluorine, and the like. More particularly, the present invention relates to the segregation of chlorine gas from contaminants. Still more particularly, the present invention relates to an improved process for purifying chlorine gas produced by the oxidation of hydrogen chloride.

In the chlorination of hydrocarbons one of the by-products is hydrogen chloride and the latter represents 50% of the chlorine supplied to the chlorination process. Hydrogen chloride may most conveniently be reconverted to chlorine by oxidation such as the well-known Deacon process wherein hydrogen chloride is reacted with gaseous oxygen at a temperature of about 450° to 550° C. in the presence of a copper-comprising catalyst. However, one of the problems of such a process is the substantial difficulty of obtaining a pure product.

The effluent gases from the Deacon process are generally 5 to 8 volume percent chlorine; nitrogen containing unreacted oxygen makes up the rest of the gas stream. In order to utilize this gas stream for further hydrocarbon chlorinating, it must be concentrated to a higher chlorine composition. Otherwise, the large amount of gas that must be handled makes it difficult and is economically prohibitive. Furthermore, a dilute chlorine stream will lead to larger capital investment due to the larger size compressors and other equipment generally necessary. Consequently, in many processes, chlorine of 99% purity is specified. Examples are chlorinating ethylene to ethylene dichloride, and chlorinating methane to methyl chloride, methylene chloride, chloroform and carbon tetrachloride.

In accordance with the present invention it has been found that substantially pure chlorine can be recovered from the oxidation of hydrogen chloride by use of certain crystalline zeolites.

It has been known for some time that certain zeolites, both naturally-occurring and synthetic, have the property of separating normal from isomeric branched chain hydrocarbons, as well as from cyclic and aromatic admixtures. The zeolites have crystal patterns such as to form structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3 to 6 angstrom units to 12 to 15 or more, but it is a property of these zeolites, or molecular sieves, that for a particular sieve the pores are of substantially uniform size.

The scientific and patent literature contains numerous references to the adsorbing action of natural and synthetic zeolites. Among the natural zeolites having this sieve property may be mentioned chabazites and analcite. A synthetic zeolite with molecular sieve properties is described in U.S. 2,442,191. Zeolites vary somewhat in composition but generally contain silica, aluminum, oxygen and an alkali and/or alkaline earth element, e.g. sodium and/or calcium, magnesium, etc. Analcite has the empirical formula $NaAlSi_2O_6.H_2O$. Barrer (U.S. 2,306,610) teaches that all or part of the sodium is replaceable by calcium to yield, on dehydration, a molecular sieve having the formula $(CaNa_2)Al_2Si_4O_{12}.2H_2O$. Black (U.S. 2,522,426) describes a synthetic molecular sieve having the formula $4CaO.Al_2O_3.4SiO_2$. A large number of other naturally-occurring zeolites having molecular sieve activity, i.e. the ability to adsorb a straight chain hydrocarbon and exclude the branched chain isomers, are described in an article, "Molecular Sieve Action of Solids," appearing in Quarterly Reviews, vol. III, pages 293–330 (1949), and published by the Chemical Society (London).

The invention will be described by reference to the accompanying drawing which contains a schematic showing of the separator.

In accordance with the present invention, chlorine gas containing trace to 10% of oxygen and 20 to 95% of nitrogen is passed through a bed of crystalline aluminosilicate zeolite having uniform pore openings and after desorption a substantially pure chlorine is recovered. In further accordance with the present invention, the oxygen-contaminated chlorine gas is passed through a bed of sodium or calcium crystalline alumino-silicate having uniform pore openings at a temperature of 50° to 150° F. and a pressure of atmospheric to 150 p.s.i.g. until no more chlorine is adsorbed. Thereafter the adsorbent is heated to 250° to 900° F., and substantially all the adsorbed chlorine is recovered. A small amount of inert purge such as nitrogen may be employed at the end of the heating step to ensure complete removal of chlorine from the zeolite.

Molecular sieve adsorbents suitable for use in the process of the invention are available commercially and may be produced in a number of ways. One suitable process for preparing such adsorbents involves the mixing of sodium silicate, preferably sodium metasilicate, with sodium aluminate under carefully controlled conditions. The sodium silicate employed should be one having a ratio of soda to silica between about 0.8 to 1 and about 2 to 1. Water glass and other sodium silicate solutions having lower soda to silica ratios do not produce the selective adsorbent crystals unless they are subjected to extended heat soaking or crystallization periods. Sodium aluminate solutions having a ratio of soda to alumina in the range of from about 1 to 1 to about 3 to 1 may be employed. High soda to alumina ratios are preferred and sodium aluminate solutions having soda to alumina ratios of about 1.5 to 1 have been found to be eminently satisfactory. The amounts of the sodium silicate and sodium aluminate solutions employed should be such that the ratio of silica to alumina in the final mixture ranges from about 0.8 to 1 to about 3 to 1, and preferably from about 1 to 1 to about 2 to 1.

These reactants are mixed in a manner to produce a precipitate having a uniform composition. A preferred method for combining them is to add the aluminate to the silicate at ambient temperatures using rapid and efficient agitation to produce a homogeneous mixture. The mixture is then heated to a temperature of from about 180° to about 215° F. and held at that temperature for a period of from about 0.5 to about 3 hours or longer. The crystals may be formed at lower temperatures but in that case longer reaction periods are required. At temperatures above about 250° F. a crystalline composition having the requisite uniform size pore openings is not obtained. During the crystallization step, the pH of the solution should be maintained on the alkaline side, at about 12 or higher. At lower pH levels, crystals having the desired properties are not as readily formed.

The crystals prepared as described above have pore diameters of about 4 angstrom units. To convert these to crystals having 5 angstrom pores, it is necessary to employ a base exchange reaction for the replacement of some of the sodium by calcium, magnesium, cobalt, nickel, iron or a similar metal. Magnesium, cobalt, nickel and iron have greater cracking activity than does calcium, and therefore it will often be preferred to employ solutions of these metals for replacement purposes.

The base exchange reaction may be carried out by water washing the sodium alumino-silicate crystals and adding them to a solution containing the desired replacement ions. An aqueous solution of magnesium chloride of about 20% concentration, for example, may be used for preparation of the magnesium form of the 5 angstrom sieve. After a contact time which may range from about 5 minutes to about an hour, the 5 angstrom product is filtered from solution and washed free of the exchange liquid. About 50 to 75% of the sodium in the crystals is normally replaced during the base exchange reaction.

The crystals thus prepared are in a finely divided state and are usually pelleted with a suitable binder material before they are calcined in order to activate them. Any of a number of binder agents used in the manufacture of catalysts may be employed for this purpose. A binder consisting of bentonite, sodium silicate and water, for example, has been found satisfactory. In using this binder, the constituents should be mixed so that the product contains from about 5 to 10% bentonite, 5 to 15% sodium silicate and about 75 to 90% of the crystals on a dry basis and that the total mixture contains about 25 to 35% water. This mixture may then be extruded into pellets or otherwise shaped and subsequently dried and calcined. Calcination temperatures of from about 700° to about 900° F. or higher are satisfactory.

To illustrate the process, an oxygen-contaminated chlorine stream containing about trace to 10% oxygen and preferably dried is passed as shown in the drawing through line 2 into reactor 4. If air is employed in the oxidation process, the feed through line 2 will likewise contain a proportionate amount of nitrogen. The feed stream is preferably dried and is admitted into adsorber 4 at a temperature of about 50° to 100° F. Similarly, the adsorber may be provided with heating means and, during the adsorption step, is maintained at a temperature of 50° to 150° F. Chlorine is adsorbed into the interstices of the adsorbent and the effluent, during the adsorption cycle, is withdrawn through line 6 and is substantially oxygen and nitrogen. When chlorine is detected in the effluent, as shown by indicator 8, the feed through line 2 is halted and may be diverted into another adsorber in parallel. The indicator may be a potassium iodide solution containing starch which turns a deep blue color even if the gas stream contains less than 0.5 volume percent chlorine. Another method for determining when the bed is saturated with chlorine is to follow the hot zone moving through the bed due to the heat of sorption. Temperature of the bed is now raised to a level of 250° to 900° F. and chlorine is desorbed. If desired, small amounts of purge gas may be admitted through line 10, particularly toward the end of the desorption to aid in the removal of residual traces of chlorine remaining in the adsorber. The chlorine stream is withdrawn through line 12 and if desired, passed into cooling zone 14 for liquefaction if it is desired to recover chlorine as a liquid. Purified chlorine is then withdrawn through line 16 and re-employed for any desired purpose such as the chlorination of hydrocarbons. Thereafter the bed is cooled and the contaminated chlorine gas is re-introduced through line 2. For an uninterrupted process two or more adsorption columns are used so that chlorine feed may be processed in one of the units during regeneration of the other unit.

The unique adsorptive properties of these crystalline zeolites are well illustrated by the data shown in the following specific examples:

EXAMPLE 1

Pure chlorine gas was passed through 800 g. fresh 5 Angstrom molecular sieves which were pre-dried at 850° F. with nitrogen purging. The operating conditions were 75° F., atmospheric pressure and 195 ml. of chlorine per minute. ($\approx$16 v./v./hr.). At these conditions, chlorine was quantitatively and selectively adsorbed. On sieve saturation, the amount of chlorine sorbed on the sieves was about 150 g. total or approximately 19 g. per 100 g. of fresh sieves. During the sorption, the nitrogen displaced by the chlorine did not show any trace of chlorine (by potassium iodide-starch indicator) and the chlorine breakthrough was very sharp upon sieve saturation. Temperature peaks amounting to over 65° F. rise due to heat of adsorption were clearly evident during the run.

Once the sieves have been saturated, the chlorine could be easily recovered by heating the sieves to about 300° F. A small nitrogen purge was used at the end of the desorption step to purge out traces of chlorine remaining in the reactor. Pure chlorine was recovered totalling essentially 100% of the initial amount sorbed on the sieves.

The sorption was repeated on the reactivated sieves with a chlorine-air mixture. Excellent selectivity in sorbing the chlorine was obtained. The composition of the gas mixture was varied from 50 to 75% chlorine and the chlorine space velocity increased from 16 to 49 v./v./hr. with no decrease in sieve selectivity. The amount of chlorine sorbed onto the sieves in the second cycle was 156 g. total which was equivalent to the first cycle sorption with fresh sieves. Thus, there was no loss in sieve capacity. Based on these results, a cyclic process for purifying chlorine should be possible.

The data on these two cycles are shown in Table I.

*Table I*

SORPTION OF CHLORINE GAS ON A 5 ANGSTROM MOLECULAR SIEVE

|  | Cycle 1 | | Cycle 2— Sorption |
|---|---|---|---|
|  | Sorption | Desorption |  |
| Feed | 100% chlorine |  | 50% chlorine: 67%, 75%. 50% air: 33%, 25%. |
| Conditions: |  |  |  |
| Temp., °F | 75 | 75–700 [1] | 75. |
| Pressure, mm. Hg | 750 | 750 | 750. |
| Chlorine rate: |  |  |  |
| Ml/min | 195 |  | 195, 400, 600. |
| V./v./hr | 16 |  | 16, 33, 49. |
| Raffinate or desorbate | Pure nitrogen | Pure chlorine | Pure air. |
| Total chlorine sorbed: |  |  |  |
| Grams | 150 |  | 156. |
| G./100 g. sieves | 19 |  | 19.5. |
| Total chlorine desorbed: |  |  |  |
| Grams |  | 150 |  |
| Percent of sorbed chlorine |  | 100 |  |

[1] Essentially all chlorine was recovered when sieves heated to 300° F.

EXAMPLE 2

To determine whether the selective adsorption of chlorine by the zeolite was due to the latter's crystalline nature or simply due to the fact that it was zeolite, or whether it was a property of alumino-silicate in general, further experimental work was carried out comparing the adsorption effects of a clay, an amorphous zeolite and the crystalline alumino-silicate described hitherto. The results are shown in Tables II, III and IV.

Table II
SORPTION OF CHLORINE GAS ON ATTAPULGUS CLAY [1]

| Cycle No. | Feed | Conditions | | Amount Cl₂ sorbed or desorbed g/100 g. clay |
|---|---|---|---|---|
| | | Temp., °F. | Cl₂ rate V./v./hr. | |
| 1—Sorption [2] | 100% Cl₂ | 75 | 35 | 1 |
| Desorption | | 75–850 | | <1 |
| 2—Sorption [2] | 10% Cl₂, 90% air | 75 | 35 | <1 |
| Desorption | | 75–850 | | <1 |

[1] 360 g. 30/60 mesh Attapulgus clay, initially dried at 850° F. with nitrogen purging.
[2] No temperature rise due to heat of adsorption was observed.

Table III
SORPTION OF CHLORINE GAS ON DECALSO ZEOLITE [1]

| Cycle No. | Feed | Conditions | | Amount Cl₂ sorbed or desorbed g./100 g. zeolite [2] |
|---|---|---|---|---|
| | | Temp., °F. | Cl₂ rate V./v./hr. | |
| 1—Sorption [3] | 100% Cl₂ | 75 | 20 | 2 |
| Desorption | | 75–850 | | 1 |
| 2—Sorption [3] | 50% Cl₂, 50% air | 75 | 25 | 2 |
| Desorption | | 75–900 | | 2 |

[1] A sodium-alumino silicate commercially available from Permutit Company.
[2] Based on zeolites which have been dried by heating to 850° F. with nitrogen purging.
[3] Temperature rise of approximately 25° F. due to heat of sorption was observed.

Table IV
SORPTION OF CHLORINE GAS ON 5 ANGSTROM MOLECULAR SIEVES [1]

| Cycle No. | Feed | Conditions | | Raffinate or desorbate [2] | Amount Cl₂ sorbed or desorbed g./100 g. sieves |
|---|---|---|---|---|---|
| | | Temp., °F. | Cl₂ rate V./v./hr. | | |
| 1—Sorption | 100% Cl₂ | 75 | 16 | 100% N₂ | 19 |
| Desorption | | [3] 75–700 | | 100% Cl₂ | 20 |
| 2—Sorption | 50% Cl₂, 50% air | 75 | 16 | 100% air | |
| | 67% Cl₂, 33% air | 75 | 33 | do | 19.5 |
| | 75% Cl₂, 25% air | 75 | 49 | do | |
| Desorption | | 75–500 | | 100% Cl₂ | 19 |

[1] 800 g. of 5 angstrom sieves, initially pre-dried at 850° F. with nitrogen purging were used to sorb Cl₂ at atmospheric pressure.
[2] Composition indicated by bubbling gas through solution containing potassium iodide and starch indicator.
[3] Essentially all chlorine was recovered when sieves were heated to 300° F.

The clay employed was Attapulgus clay and the amorphous zeolite, a commercially available zeolite called "Decalso" distributed by the Permutit Company. It will be noted that in both cases only 1 to 2 grams of chlorine were sorbed per 100 grams of adsorbent. On the other hand, 20 grams of chlorine were sorbed on the 5 angstrom, i.e. the crystalline alumino-silicate zeolite. A further indication that chlorine is substantially more strongly sorbed by the crystalline zeolite is shown by the heat of adsorption. In the case of a molecular sieve, a temperature rise of over 65° F. was observed whereas on the amorphous Decalso zeolite only a 25° F. rise was evident. Attapulgus clay showed no temperature rise at all.

The process of the present invention may be subjected to many variations without departing from its scope.

Thus, under certain circumstances it may be desirable to employ crystalline sodium alumino-silicate zeolites having uniform pore openings of about 4 angstrom units. This zeolite is the product that is obtained initially by the process described hitherto prior to the base exchange. It may also, under certain other circumstances, be desirable to employ a zeolite having somewhat larger pore openings of 10 to 13 angstrom units. These compositions have an empirical formula—

$$\frac{Me_2O}{n} \cdot Al_2O_3 \cdot 2.7 \pm 0.5 SiO_2$$

where Me is a metal and $n$ is its valence. These are prepared in a manner analogous to that of the smaller pore zeolites save that the silica to alumina ratio is higher.

In Examples 3 and 4 below there are shown illustrations wherein chlorine was recovered in accordance with the present invention by passing it through a 4 angstrom and 13 angstrom bed of crystalline zeolite respectively.

EXAMPLE 3

This is a cyclic run in which chlorine or chlorine-air mixtures were passed through 600 grams of 4 angstrom molecular sieves. The sieves were initially dried at 850° F. by nitrogen purging. Sorption conditions were 80° F., atmospheric pressure. Chlorine space velocity was varied from 17 to as high as 90 v./v./hr. Composition of the gas was adjusted from 35 to 100% chlorine. Chlorine sorption was excellent and temperature peaks amounting to 75° F. rise due to heat of sorption were observed. No trace of chlorine was evident in the raffinate gas until the sieves were saturated. At less than 20 v./v./hr., chlorine space velocity, sieve capacity was approximately 13 g. chlorine/100 g. sieves. At higher chlorine space velocity, there was a decrease in sieve capacity. However, even at 90 v./v./hr., sieve capacity was still 10.5 g./100 g. sieves.

Chlorine was recovered by heating the sieves to 850° to 900° F. range. In all cases, the recovered chlorine analyzed over 98% purity. Most of the 2% contaminant is probably due to nitrogen purging at the end of desorption step used to remove residual chlorine from the sieves. Although the sieves were desorbed at 850° to 900° F. range, a lower temperature may be employed. In cycles 4 and 5, tests showed that 97% of the chlorine that could be desorbed was recovered at a desorption temperature of 300° F.

The data for this cyclic run are shown in Table V.

Table V
SORPTION OF CHLORINE ON 4 ANGSTROM MOLECULAR SIEVES

| Cycle No. | Feed | Conditions | | Amount Cl₂ sorbed or desorbed g./100 g. sieves |
|---|---|---|---|---|
| | | Temp., °F. | Cl₂ rate V./v./hr. | |
| 1—Sorption | 100% Cl₂ | [1] 80 | [2] >40 | 6 |
| Desorption | | 80–900 | | 5 |
| 2—Sorption | 100% Cl₂ | 75 | 24 | 9.5 |
| Desorption | | 75–860 | | 9 |
| 3—Sorption | 100% Cl₂ | 80 | 17 | 13.5 |
| Desorption | | 80–870 | | 13.5 |
| 4—Sorption | 100% Cl₂ | 80 | 18 | 14 |
| Desorption | | 80–860 | | [3] 13.5 |
| 5—Sorption | 60% Cl₂, 40% air | 80 | 19 | 13.5 |
| Desorption | | 80–900 | | [3] 13 |
| 6—Sorption | 55% Cl₂, 45% air | 75 | 44 | 12 |
| Desorption | | 75–920 | | 12 |
| 7—Sorption | 65% Cl₂, 35% air | 80 | 90 | 10.5 |
| Desorption | | 80–890 | | 10.5 |
| 8—Sorption | 100% Cl₂ | 80 | 18 | 13 |

[1] Temperature rise of 100° F. due to heat of adsorption was observed.
[2] Chlorine rate very unsteady.
[3] 97% of the total chlorine desorbed was recovered when sieves heated to 300° F.

EXAMPLE 4

Chlorine or chlorine-air mixtures were passed through 575 grams of dried 13 angstrom molecular sieves. Average operating conditions were as follows:

Sorption _____ 75° F., atmospheric pressure, chlorine feed rate 27 v./v./hr.

Desorption _____ 880° F., atmospheric pressure.

Five cycles were carried out. In all cases, good selectivity was apparent in sorbing chlorine. On the average, about 19 g. of chlorine were sorbed by 100 g. of 13 angstrom sieves. In cycles 3 and 4, the desorbed gas analyzed over 98% purity. Table VI summarizes the experimental data:

*Table VI*

SORPTION OF CHLORINE ON 13 ANGSTROM MOLECULAR SIEVES

| Cycle No. | Feed | Conditions | | Amount $Cl_2$ sorbed or desorbed g./100 g. sieves |
|---|---|---|---|---|
| | | Temp., °F. | $Cl_2$ rate V./v./hr. | |
| 1—Sorption | 100% $Cl_2$ | [1] 75 | 28 | 20.5 |
| Desorption | | 75–855 | | 19 |
| 2—Sorption | 100% $Cl_2$ | 75 | 40 | 19.5 |
| Desorption | | 75–910 | | 19 |
| 3—Sorption | 54% $Cl_2$, 46% air | 75 | 22 | 17 |
| Desorption | | 75–840 | | [2] 17 |
| 4—Sorption | 63% $Cl_2$, 37% air | 90 | 23 | 19 |
| Desorption | | 80–905 | | [2] 18.5 |
| 5—Sorption | 100% $Cl_2$ | 75 | 24 | 18.5 |

[1] Temperature rise of 125° F. due to heat of sorption was observed.
[2] Desorbed chlorine analyzed >98% purity.

Although this invention is described as a fixed bed process, a moving bed system is also applicable to this type of reaction. Such a system may consist of sieve pellets which adsorb chlorine while moving downward countercurrent to the feed. The saturated sieve from the adsorber flows down into another vessel where heat is applied to desorb off the chlorine. The regenerated sieves are then transported back to the adsorber for re-use.

The scope of this invention is not limited to separating chlorine from oxygen and nitrogen. Any monatomic gas such as argon, neon, krypton, xenon or helium can be separated by adsorbing the chlorine on sieves. Hydrogen can also be separated from chlorine. Data presented in Table VII show that hydrogen gas containing 6% chlorine can be purified to 0.03% chlorine. Chlorine and carbon dioxide can be separated, but the mechanism is different. Initially, the fresh sieves adsorb both chlorine and carbon dioxide. Upon saturation, as indicated by chlorine breakthrough, the carbon dioxide begins to displace the adsorbed chlorine until the bed is free of chlorine and completely saturated with carbon dioxide. In this way, essentially pure chlorine is recovered in the sorption step. The carbon dioxide saturated sieves can be reactivated entirely by heating or partially by displacing with pure chlorine.

Although this process has been described for sorbing chlorine, it can also be employed for separating other halogens. Table VIII presents some data on sorbing bromine.

*Table VIII*

SORPTION OF BROMINE ON 5 ANGSTROM MOLECULAR SIEVES

| Cycle No. | Feed | Conditions | | Amount $Br_2$ sorbed or desorbed g./100 g. sieves |
|---|---|---|---|---|
| | | Temp., °F. | $Br_2$ rate V./v./hr. | |
| 1—Sorption [1] | 100% $Br_2$ | 200 | 70 | 45 |
| Desorption | | 80–700 | | 43 |
| 2—Sorption | 90% $N_2$,[2] 10% $Br_2$ | [3] 80 | 16 | 40.5 |
| Desorption | | 80–700 | | 41 |

[1] Feed distilled through sieves maintained at 200° F.
[2] Mixture of nitrogen and bromine vapor produced by passing a nitrogen stream over liquid bromine. A vacuum of 400 mm. Hg was employed at reactor exit.
[3] Temperature rise of approximately 65° F. due to heat of absorption was observed.

What is claimed is:

1. An improved process for recovering a halogen from a mixture, said mixture consisting essentially of said halogen and at least one of the gases selected from the group consisting of oxygen, nitrogen, hydrogen, and monatomic gases which comprises passing a vaporized stream of said mixture into an adsorption zone, contacting said mixture with a crystalline metallic aluminosilicate zeolite having uniform pore openings from 4 to 13 angstrom units, selectively adsorbing said halogen while withdrawing unadsorbed contaminants, and thereafter recovering purified halogen from said zone.

2. An improved process for purifying chlorine gas which comprises contacting a mixture consisting essentially of chlorine and at least one of the gases selected from the group consisting of oxygen, nitrogen, hydrogen, and monatomic gases with a crystalline metallic alumino silicate zeolite having uniform pore openings from 4 to 13 angstrom units at a temperature of about 50° to 150° F., selectively adsorbing said chlorine, withdrawing unadsorbed gases, thereafter raising the temperature of said zeolite to about 250° to 900° F., and recovering substantially pure chlorine.

3. The process of purifying chlorine gas produced by the oxidation of hydrogen chloride which comprises passing a mixture consisting essentially of chlorine, up to 10% oxygen and from 20 to 95% $N_2$ into a bed of metallic crystalline alumino-silicate zeolite having a uniform pore opening of about 5 angstroms in an adsorption zone, maintaining a temperature of about 50° to 150° F. in said zone, selectively adsorbing $Cl_2$, withdrawing unad-

*Table VII*

SEPARATION OF CHLORINE FROM OTHER GASES ON 5 ANGSTROM SIEVES

| Cycle No. | Feed | Conditions | | Material sorbed or desorbed | Amount sorbed or desorbed g./100 g. sieves |
|---|---|---|---|---|---|
| | | Temp., °F. | $Cl_2$ rate V./v./hr. | | |
| 1—Sorption | 35% $Cl_2$, 65% argon | 70 | 16 | $Cl_2$ sorbed | 18.5 |
| Desorption | | 80–400 | | $Cl_2$ desorbed | [1] 18.1 |
| 2—Sorption [2] | 42% $Cl_2$, 58% $CO_2$ | 80 | 15 | $Cl_2$ and $CO_2$ both sorbed | 18 |
| | 42% $Cl_2$, 58% $CO_2$ | 80 | 15 | $CO_2$ sorbed, | 8.1 |
| | | | | $Cl_2$ displaced | 9.6 |
| Desorption | | 80–900 | | $CO_2$ desorbed | 16 |
| 3—Sorption | 100% $CO_2$ | 80 | | $CO_2$ sorbed | 13.5 |
| | 100% $Cl_2$ | 80 | 25 | $Cl_2$ sorbed | >14 |
| | | | | $CO_2$ partially displaced | |
| Desorption | | 80–400 | | $Cl_2$ desorbed, contaminated with $CO_2$ (≈10%) | |
| 4—Sorption | 6% $Cl_2$, 94% $H_2$ | 80 | | $Cl_2$ sorbed, $H_2$ Effluent contained 0.03% $Cl_2$ | 18.5 |

[1] Of this amount, 3.9 g. of chlorine/100 g. sieves were recovered initially by vacuum stripping at 50 mm. Hg absolute pressure at 80° F.
[2] Chlorine and carbon dioxide both sorbed until sieves are saturated. Then, carbon dioxide begins to displace sorbed chlorin.

sorbed $O_2$ and $N_2$ from said zone, thereafter increasing said temperature from 250° to about 900° F., and recovering substantially pure chlorine.

4. The process of claim 3 wherein said mixture is dried prior to passage through said adsorption zone.

5. The process of claim 3 wherein an inert gas purge is employed during the desorption stage.

6. An improved process for purifying chlorine gas contaminated with carbon dioxide which comprises contacting the mixture with a crystalline metallic alumino silicate zeolite having uniform pore openings from 4 to 13 angstrom units in an adsorption zone; adsorbing chlorine and carbon dioxide on said crystalline zeolite; continuing the introduction of said mixture; displacing the adsorbed chlorine with the carbon dioxide in said mixture; and withdrawing from said adsorption zone a stream consisting essentially of chlorine.

References Cited in the file of this patent
UNITED STATES PATENTS 1,617,305    Guyer et al. _____ Feb. 8, 1927

OTHER REFERENCES

J. Soc. Chem. Ind., volume 64, May 1945, pages 130–135.